United States Patent [19]

Woods

[11] 4,164,000

[45] Aug. 7, 1979

[54] RELAY-STARTER ELECTRICAL DEVICE FOR A PRIME MOVER

[75] Inventor: Lee O. Woods, Morrison, Ill.

[73] Assignee: General Electric Company, Fort Wayne, Ind.

[21] Appl. No.: 829,276

[22] Filed: Aug. 31, 1977

[51] Int. Cl.[2] .......... H02H 7/08

[52] U.S. Cl. .......... 361/27; 318/791; 335/202

[58] Field of Search .......... 361/27, 24, 25; 318/221 H, 221 E, 221 G; 335/2, 6, 202; 29/622

[56] References Cited

U.S. PATENT DOCUMENTS

| | | | |
|---|---|---|---|
| 3,130,284 | 4/1964 | Woods | 335/156 |
| 3,287,675 | 11/1966 | Woods | 335/202 |
| 3,835,434 | 9/1974 | Kahn | 338/22 |
| 3,921,117 | 11/1975 | Blaha | 318/221 H |
| 3,965,392 | 6/1976 | Moorhead et al. | 318/221 H |
| 3,988,709 | 10/1976 | McKinnon | 361/27 |
| 4,037,316 | 7/1977 | Stoll | 361/27 |

*Primary Examiner*—Harold Broome
*Attorney, Agent, or Firm*—Joseph E. Papin

[57] ABSTRACT

A combination relay-starter electrical device is adapted for connection in circuit relation with a winding circuit of a prime mover. The electrical device has a pair of terminal means adapted for the connection in the circuit relation with the prime mover winding circuit, and coil means adapted for electrical energization. Means arranged in magnetic coupling relation with the coil means is operable generally for switching between a circuit completing position and a circuit interrupting position upon the energization of the coil means, and means is provided for housing the terminal means, the coil means and the switching means. A solid state device associated with the housing means is connected in circuit relation between the switching means and one of the terminal means so as to be de-energized when the switching means is in its circuit interrupting position.

Another electrical device is also disclosed.

27 Claims, 9 Drawing Figures

RELAY-STARTER ELECTRICAL DEVICE FOR A PRIME MOVER

FIELD OF THE INVENTION

This invention relates generally to electrical devices and in particular to those which may be utilized to control the energization of a prime mover.

BACKGROUND OF THE INVENTION

In the past, various types of prime movers, such as dynamoelectric machines or electric motors for instance, were provided with a winding circuit in a stationary assembly, such as a stator or the like for instance, having parallel connected main or run winding means and auxiliary or start winding means. During a starting mode or operation of these past types of prime movers, the winding circuit thereof was initially connected across a power source by suitable operator operated switching means to effect the generally conjoint excitation of the main winding means and the auxiliary winding means at least until a rotatable assembly magnetically associated with the main winding means and the auxiliary winding means of the stationary assembly was energized generally to a preselected speed. Of course, various prior art mechanisms or devices were utilized to render the auxiliary winding means ineffective in the winding circuit generally when the preselected speed of the prime mover, i.e., the rotatable assembly thereof, was attained.

Some of these prior art devices for controlling the excitation of the auxiliary winding means were mechanical speed responsive devices. For instances, when the rotatable assembly attained the preselected speed, a centrifugal mechanism carried on the rotatable assembly was actuated to move an associated collar generally axially on the rotatable assembly from an at-rest position toward another position, and upon such axial movement to its another position, the collar drove linkage means for operating a switch which effected the de-excitation of the auxiliary winding means by disconnecting it from the power source. Thus, with the auxiliary winding means rendered ineffective in the winding circuit, the prime mover then was energized generally at the preselected speed thereof in response to the continued excitation of only the main winding means. Of course, at least one of the disadvantageous or undesirable features of the aforementioned centrifugal mechanism and associated linkage means is believed to be those well-known limitations attributable to most all mechanical devices, such as tolerance problems, wear problems, noise problems and, in some instances, reliability problems.

In other types of these prior art prime movers, a current relay was employed for controlling the excitation of the auxiliary winding means. For instance, a coil of the current relay was serially connected in the winding circuit with the main winding means thereof, and contact means of the current relay was serially connected in the winding circuit with the auxiliary winding means thereof. When the prime mover was energized across the line, as previously mentioned, the coil of the current relay and the main winding means were excited, and the excitation of the relay coil effected the magnetic closure of the contact means of the relay so as to effect the excitation of the auxiliary winding means; therefore, in this manner, the main winding means and the auxiliary winding means were generally conjointly excited to energize the prime mover to generally its preselected speed during a starting mode thereof. Of course, when the prime mover was so energized generally to its preselected speed, the current draw of the main winding means was appreciably reduced, and such reduction of current caused the relay coil to weaken its magnetic affect thereby to permit the contact means of the current relay to return to their at-rest or open position. Thus, with the relay contact means so opened to interrupt current flow to the auxiliary winding means, the auxiliary winding means were rendered ineffective generally at the time the prime mover attains its preselected speed, and the prime mover remained energized generally at the preselected speed thereof during its running mode or operation in response to the continued excitation of only the main winding means. At least one of the disadvantageous or undesirable features of such past prime movers utilizing a current relay for controlling excitation of the auxiliary winding means is believed to be that at least in some instances the contact means of the current relay had a tendency to weld in response to the generally large current draw by the auxiliary windings during the starting operation of the prime mover. Another disadvantageous or undesirable feature is believed to be that at least in some instances, the current relay generated radio and television interference at the instant of make and break due to arcing of the contact means.

Another one of the prior art devices for controlling the excitation of the auxiliary winding means was a positive temperature coefficient resistor (PTCR) which was connected in series with the auxiliary winding means of the prime mover. When the prime mover was energized across the line, the main winding means and auxiliary winding means were initially conjointly excited since the PTCR exhibited little initial resistance to current flow to the auxiliary winding means. The PTCR acts generally as a low value resistor until its internal temperature reaches its "Curie" point or anomaly temperature at which time its resistance increases abruptly along with an increase of its temperature. Therefore, the temperature of the PTCR was increased in response to current flow therethrough to the auxiliary winding means during the starting operation of the prime mover, and generally at the time the prime mover attained its preselected speed, the resistance of the PTCR abruptly increased to a value appreciably limiting current flow therethrough. Thus, the auxiliary winding means was, in effect, rendered generally ineffective in the winding circuit generally at the time the prime mover attained its preselected speed, and the prime mover remained energized generally at the preselected speed thereof in response to the continued excitation of the main winding means. Of course, so long as the PTCR was energized, it remained "hot" exhibiting a high resistance to current flow, and it is believed that, under certain conditions, this may be a disadvantageous or undesirable feature. For instance, if for some reason the prime mover had not been energized to the preselected speed so that the torque of the main winding means alone would sustain such preselected speed, then the prime mover would stall to zero speed and remain there since the PTCR would, in effect, block current flow to the auxiliary winding means. If an overload protection system of the prime mover did not alleviate the aforementioned stalled condition or locked rotor condition of the prime mover or if such overload protection system did not reset itself before the PTCR had time to cool, this stalled condition of the prime mover would be perpetuated.

In the event the winding circuit of the prime mover was provided with run and/or start capacitors so that the PTCR was subjected to continuous voltage stress, it is believed that at least one disadvantageous or undesirable feature of this arrangement is that the PTCR may be subjected to voltage stress which may exceed the oversurface break down characteristic of the PTCR; therefore, as a result of this situation, it may have been necessary to provide the PTCR with a rather complicated and expensive external insulation system to inhibit such oversurface break down characteristics which, of course, is also believed to be a disadvantageous or undesirable feature. In addition to the foregoing, if "heat sinks", such as metallic fins or other metal masses or the like, were employed in conjunction with the PTCR to hasten its recovery after it has been de-energized, it is believed that the PTCR may have been subjected to thermal stressing having a capacity to physically deteriorate or destroy the PTCR which is, of course, also believed to be a disadvantageous or undesirable feature.

The William C. Rathje application Ser. No. 778,335 filed Mar. 17, 1977 illustrates the compatable use of a current relay, PTCR starting device and an overload protector with a winding circuit of a prime mover. The Lee O. Woods et al. U.S. Pat. No. 4,042,860 issued Aug. 16, 1977 and the Donald H. Stoll U.S. Pat. No. 4,084,202 issued Apr. 11, 1978 each disclose a combination starter-protector device utilized with a winding circuit of a prime mover.

In another past installation, a PTCR starting device was connected in a prime mover starting circuit by individual circuit leads, and a starting capacitor was connected across the PTCR starting device by similar individual circuit leads. In this type of circuit arrangement, the PTCR starting device and starting capacitor were either loosely hung on the individual circuit leads from a terminal board or the like of the prime mover or, in some instances, from a Fusite plug if the prime mover was operated in a hermetic environment. Thus, it is believed that at least one disadvantageous or undesirable feature of this type of circuit arrangement utilizing the aforementioned loosely hung electrical devices, such as for instance the starting capacitor and the PTCR starting device as well as other electrical device for controlling the energization of a prime mover, was that such loosely hung electrical devices could be inadvertantly disconnected from each other by a workman or operator in the vicinity of the prime mover.

SUMMARY OF THE INVENTION

Among the several objects of the present invention may be noted the provision of improved electrical devices which overcome at least some of the above discussed disadvantageous or undesirable features, as well as others, with respect to the prior art; the provision of such improved electrical devices which accommodate the smaller mounting spaces which may be encountered in some of the present day prime mover installations; the provision of such improved electrical devices which are unitized for compactness; the provision of such improved electrical devices including a current relay and a solid state device arranged so that selected terminal means thereof are mechanically and electrically interconnected in circuit relation; and the provision of such electrical devices having components which are simplified in design, easily assembled and connected, and economically manufactured. These as well as other objects and advantageous features of the present invention will be in part apparent and in part pointed out hereinafter.

In general, a combination relay-starter electrical device in one form of the invention is adapted for connection in circuit relation with a winding circuit of a prime mover. This electrical device has a pair of terminal means adapted for the connection in the circuit relation with the prime mover winding circuit, and coil means adapted for electrical energization. Means arranged in magnetic coupling relation with the coil means is operable generally for switching between a circuit completing position and a circuit interrupting position upon the energization of the coil means, and means is provided for housing the terminal means, the coil means and the switching means. A solid state device associated with the housing means is connected in circuit relation between the switching means and one of the terminal means so as to be de-energized when the switching means is in its circuit interrupting position.

Further in general, an electrical device in one form of the invention has a casing with recess means therein, and a PTCR is disposed in the recess means. First means for electrically contacting and supporting the PTCR is disposed within the recess means and includes first terminal means extending at least in part through the casing. Means is arranged with the casing so as to close at least in part the recess means for retaining against displacement therefrom the PTCR. The displacement retaining means includes second means for electrically contacting and supporting the PTCR in the recess means, second terminal means, and a plurality of means for releasably securing the retaining means with the casing.

BRIEF DESCRIPTION OF THE DRAWINGS

Corresponding reference characters indicate corresponding parts throughout the several views of the drawings.

The exemplifications set out herein illustrate the preferred embodiments of the present invention in one form thereof, and such exemplifications are not to be construed as limiting in any manner the scope of the invention or the disclosure thereof.

DETAILED DESCRIPTION OF THE PREFERRED EMBODIMENTS

Figure 1:
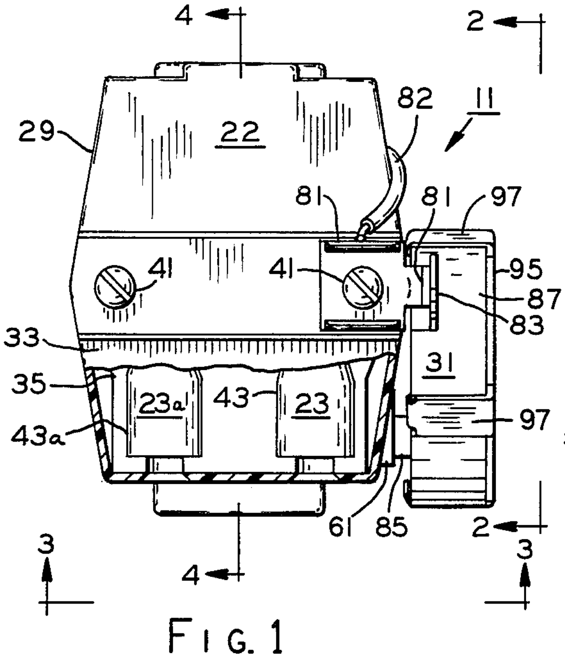
FIG. 1 is a plan view illustrating a combination relay-starter device in one form of the invention and teaching principles which may be utilized in a method of assembling such device
Figure 2:
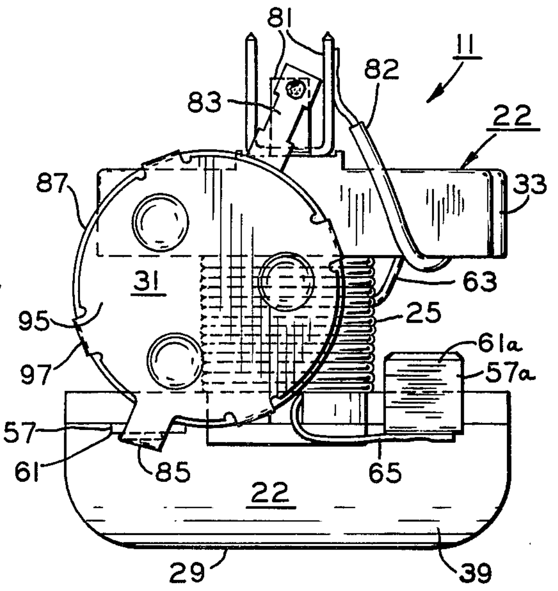
FIG. 2 is a right side elevational view of the device of FIG. 1.
Figure 3:
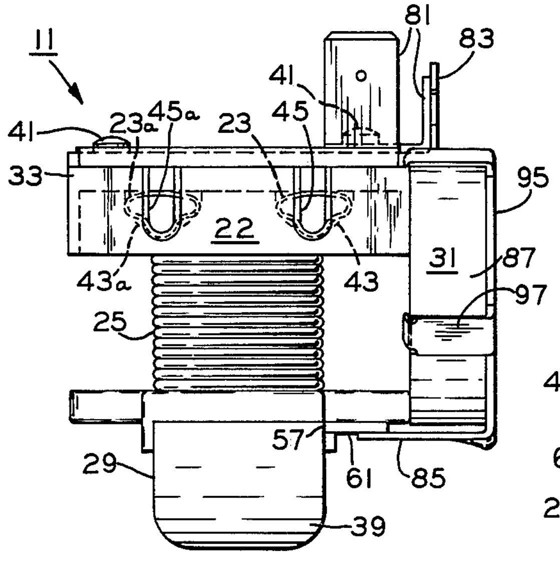
FIG. 3 is a rear elevational view of the device of FIG. 1.
Figure 4:
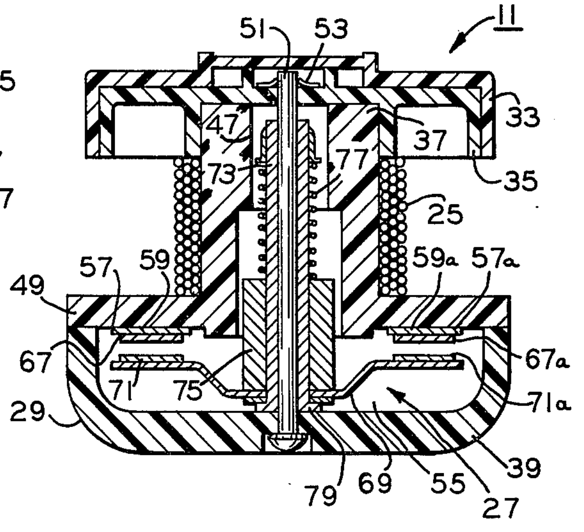
FIG. 4 is a sectional view taken along line 4—4 in FIG. 1.

Referring now to the drawings in general, an electrical device, such as a combination relay-starter device 11 in one form of the invention, is adapted for connection in circuit relation, i.e., removably mounted in plug-on circuit relation, with a pair of terminals, such as male terminals 13, 13*a*, electrically associated with auxiliary or start winding means 15 and main or run winding means 17 in a winding circuit 19 of a prime mover, such as a dynamoelectric machine or electric motor 21 (FIGS. 1-4 and 9). Electrical device 11 includes current relay means 22 which has a pair of terminal means, such as female terminals 23, 23*a*, adapted to receive male terminals 13, 13*a* in the plug-on circuit relation, coil means 25, and means, such as a switch or switch means indicated generally at 27, arranged in magnetic coupling relation with the coil means so as to be operable generally between a circuit interrupting position and a circuit completing position (FIGS. 1 and 4). Means, as indicated generally at 29, is provided for housing female terminals 23, 23*a*, coil means 25, and switch or switching means 27, and electrical device 11 also includes a solid state device 31 associated with housing means 29 and connected in circuit relation between the switching means and one of the female terminals so as to be de-energized when the switching means is in its circuit interrupting position (FIGS. 1-4).

More particularly and with specific reference to FIGS. 1-4, housing means 29 has a plurality of housing portions which are molded or otherwise formed of suitable dielectric material, such as any suitable plastic for instance, and such housing portions include a cover 33, a flange 35, a bobbin 37 and a closure member 39. Cover 33 is releasably secured to flange 35 by suitable means, such as for instance a pair of screws 41 or the like, so as to capture female terminals 23, 23*a* in a pair of cavities 43, 43*a* provided therefor in the flange, and a pair of openings or apertures 45, 45*a* in the cover are located with respect to the cavities and the female terminals therein for accommodating the passage of male terminals 13, 13*a* through the cover openings toward the cavities so as to be received into electrical contacting engagement with the female terminals when electrical device is removably mounted in the plug-on relation with the male terminals. Thus, cover 33 and flange 35 with female terminals 23, 23*a* captured therebetween comprise a receptacle means for electrical device 11 which is removably mounted in the plug-on relation with male terminals 13, 13*a*. While screws 41 are disclosed above as releasably securing cover 33 and flange 35, it is contemplated that other means may be utilized within the scope of the invention so as to meet the objects thereof for releasably securing the cover and flange, such as disclosed in the Thomas J. Kindelspire application Ser. No. 795,797 filed May 11, 1977 for instance.

Bobbin 37 has a bore 47 extending between the opposite ends thereof, and an integral base 49 extends generally radially of the bobbin adjacent one of the opposite ends thereof. A headed pin 51 extending through bobbin bore 47, closure member 39 and flange 35 retains the closure member seated on bobbin base 49 and retains the flange seated on the other end of bobbin 37, and a jam nut or washer 53 or the like is fixedly connected between the pin and the flange thereby to retain the flange and closure member against displacement from the bobbin. Thus, flange 35, bobbin 37 and closure member 39 enclose or define a switching or switch means operating chamber 55 which includes bobbin bore 47. A pair of terminal means, such as switch or switching means terminals 57, 57*a*, are mounted between bobbin base 49 and closure member 39 and have contact sections 59, 59*a* and electrical connector sections 61, 61*a* extending interiorly and exteriorly of switch means chamber 55, respectively.

Coil means or relay coil 25 comprises a plurality of turns of dielectrically coated wire wound about bobbin 37 between base 49 thereof and flange 35, and one end or lead part 63 of the turn plurality extends between cover 33 and flange 35 and is connected by suitable means, such as soldering or crimping for instance, with female terminal 23*a* while the other end or lead part 65 of the turn plurality is connected by suitable means, such as soldering for instance, to the exterior end or electrical connector section of switch means terminal 57*a*.

Switching means 27 includes switch means terminals 57, 57*a* which have a pair of contacts 67, 67*a* mounted to contact sections 59, 59*a* of the switch means terminals in chamber 55, and a bridge 69 carries another pair of contacts 71, 71*a* adapted for making and breaking engagement with contacts 67, 67*a*, respectively. Bridge 69 is carried adjacent the lower end of a sleeve 73 slidably movable on pin 51, and an armature means 75 is slidably received about the sleeve and predeterminately positioned so as to be coupled in magnetic relation with coil means 25 upon the energization thereof. Resilient means, such as coil spring 77, is caged between armature means 75 and the upper end of sleeve 73. Thus in the at-rest or circuit interrupting position of switching means 27, the weight of armature means 75 acting on bridge 69 urges it into abutment with a hub 79 on the lower end of sleeve 73 and also urges the hub into abutment with closure member 39 thereby to break or disengage contacts 71, 71*a* from contacts 67, 67*a* in the circuit interrupting position of switching means 27.

A dummy terminal 81 is secured or mounted on cover 33 by one of the screws 41 so as to be disposed generally in the vicinity of solid state or electrical device 31, and another lead 82 which extends between the cover and flange 35 is connected in circuit relation between the dummy terminal and female terminal 23 by suitable means such as soldering or crimping or the like. While dummy terminal 81 is disclosed as being mounted by screw 41 to cover 33, it is contemplated that the dummy terminal may be so mounted or secured by other suitable means, such as being molded in place, staked in place or riveted or the like, within the scope of the invention so as to meet objects and advantageous features thereof. As discussed in greater detail hereinafter, solid state device 31 is a PTCR starting or starting controlling device and has a pair of terminals or terminal means 83, 85 extending at least in part exteriorly thereof, and the terminals are both mechanically and electrically mounted or connected directly onto dummy terminal 81 and electrical connector section 61 of switch means terminal 57 by suitable means, such as for instance soldering or the like; however, it is also contemplated that terminal 83, 85, dummy terminal 81 and switch means terminal 57 may have shapes or configurations other than those disclosed herein so as to be both mechanically and electrically mounted together within the scope of the invention so as to meet the objects and advantageous features thereof. For instance, terminals 83, 85, dummy terminal 81 and switch means terminal 57 may be of the mating plug-on type or other quick connect or disconnect types. Thus, with terminals 83, 85 of solid state device 31 interconnected with dummy terminal 81 and switch means terminal 57, the solid state device is connected in circuit relation between switching means 27 and female terminal 23.

Referring again in general to the drawings and recapitulating at least in part with respect to the foregoing, a method is provided for assembling electrical device 11 which includes current relay means 22 having housing means 29 provided with at least one female terminal 23 disposed therein and at least one switch means terminal 57 extending exteriorly of the mounting means (FIGS. 1 and 4). In this method, solid state device 31 is disposed at least closely adjacent housing means 29 exteriorly thereof, and the solid state device is connected in circuit relation between female terminal 23 and switch means terminal 57. As previously discussed, the connection of solid state device 31 in the circuit relation between switching means 27 and female terminal 23 is effected by the direct mechanical and electrical mounting or connection of solid state device terminals 83, 85 with dummy terminal 81 and switch means terminal 57 with the dummy terminal being electrically connected by lead 82 in the circuit relation to female terminal 23.

Figure 5:
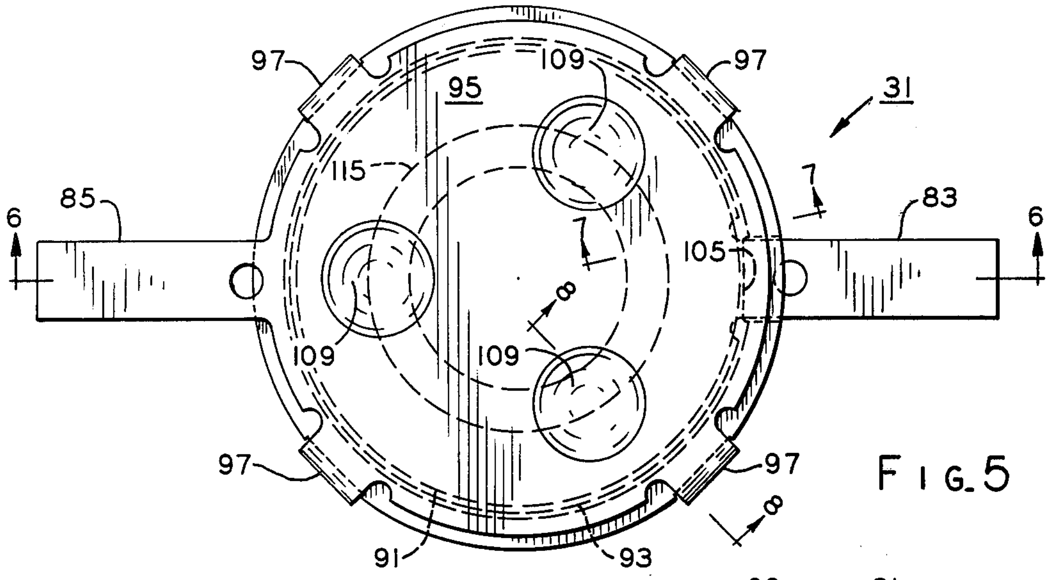
FIG. 5 is a plan view of a starter device in one form of the invention as shown separated from the device of FIG. 1 and teaching principles which may be utilized in a method of assembling the starter device.
Figure 6:
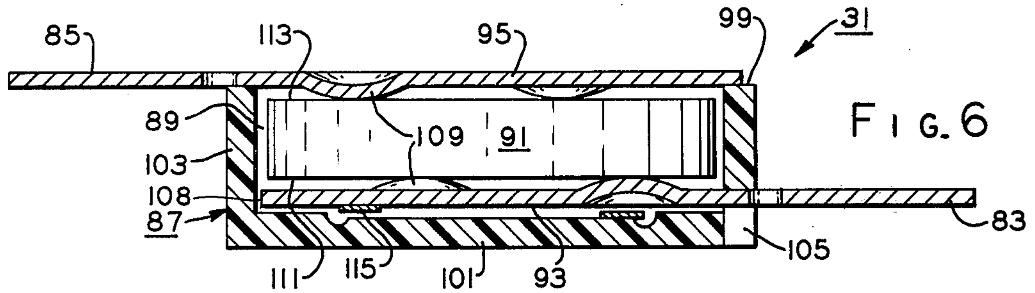
FIG. 6 is a sectional view taken along line 6—6 in FIG. 5.
Figure 7:
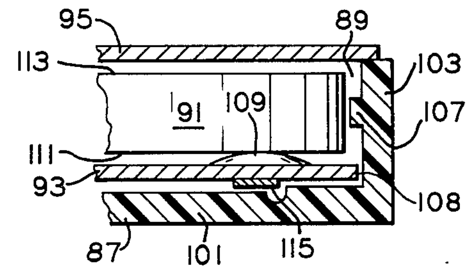
FIGS. 7 and 8 are partial sectional views respectively taken along lines 7—7 and 8—8 in FIG. 5, respectively.
Figure 8:
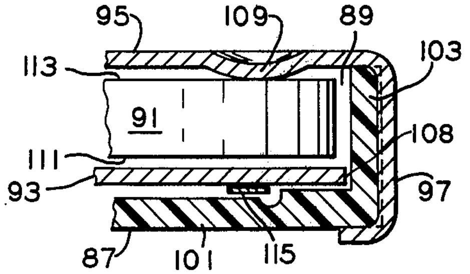

Solid state device 31 in one form of the invention has a casing 87 with recess means 89 therein, and a solid state component, such as a PTCR 91, is disposed in the recess means (FIGS. 5-8). Means, such as a metal plate 93 or the like, for electrically contacting and supporting PTCR 91 is disposed within recess means 89 and includes terminal 83 integrally formed or connected therewith, and the terminal extends at least in part through casing 87 exteriorly thereof (FIGS. 5 and 6). Means is arranged with casing 87 so as to close at least in part recess means 89 for retaining against displacement therefrom PTCR 91, and the displacement preventing means comprises means, such as another metal plate 95 or the like, for electrically contacting and supporting the PTCR in the recess means (FIGS. 5 and 6). Contacting and supporting means or plate 95 includes terminal 85 which is integrally formed or connected therewith and also a plurality of means, such as fingers or straps 97, for releasably securing plate 95 with casing 87 (FIGS. 5, 6 and 8). Of course, solid state device 31 is adapted for connection generally in circuit relation between a power source L1, L2 and winding circuit 19 of prime mover 21 (FIG. 9), as discussed in greater detail hereinafter.

More particularly and with specific reference to FIGS. 5-8, casing 87 of solid state device 31 is provided with a plurality of wall means including a pair of generally opposite end walls or portions 99, 101 integrally interconnected by a sidewall 103 so as to generally define recess means 89, and the recess means intersects with end wall 99 so as to be generally open-ended. An opening 105 is provided through end or base wall 101 and sidewall 103 of casing 87 so as to intersect with recess means 89 generally adjacent the end wall 101, and a plurality of spacers, such as nipples or abutments 107, are integrally provided on the sidewall within the recess means for spacing or locating engagement with PTCR 91.

Plate or contacting and supporting means pair 93, 95 are illustrated for purposes of disclosure as having a generally round or circular shape, but it is contemplated that plates having various other shapes or configurations may be utilized within the scope of the invention so as to meet the objects and advantageous features thereof. Plate 93 is disposed generally closely adjacent or in overlaying relation with casing end wall 101 within recess means 89, and means, such as an abutment or side edge portion 108, is provided on the plate for positioning or locating engagement with casing sidewall 103. Integral or male terminal 83 which extends from plate 93 is positioned or located so as to protrude through opening 105 in casing 87 exteriorly thereof when the plate is positioned or located within recess means 89. A plurality of indentations or dimples 109 may be provided in each of plates 93, 95 so as to insure good electrical contacting and mechanical supporting or positioning engagement with a pair of opposite contact sides 111, 113 of PTCR which is operable generally for controlling starting of prime mover 21 when connected in circuit relation with winding circuit 19 thereof, as discussed in detail hereinafter.

PTCR 91 is generally cylindric in shape and operable generally in response to current flow therethrough to vary or increase its resistance generally as a function of its temperature so as to generate heat when energized, and of course, opposite sides 111, 113 of PTCR 91 are coated or otherwise covered or layered with a chemical composition (not shown) so as to insure the generally even or constant flow or distribution of current through the PTCR from one of the opposite sides to the other thereof. In this manner, PTCR 91 is embraced, i.e., supported or positioned in both the electrical contacting and mechanical positioning or supporting engagement, between contact plates 93, 95 within recess means 89 of casing 87. While PTCR 91 is shown having a generally cylindric shape, it is contemplated that a PTCR having a shape other than cylindric may be employed within the scope of the invention so as to meet the objects thereof.

Plate 95 is arranged with or disposed on end wall 99 of casing 87 so as to at least in part close recess means 89 with indentations 109 of the plate engaging contact side 113 of PTCR 91 within the recess means, and, of course, integral or male terminal 85 of the plate is disposed so as to extend or be located exteriorly of casing 87. With plate 95 so associated with casing 87, as described above, the strap plurality 97 of the plate may then be bent or otherwise deformed away from the plane of the plate generally about casing 87 and into releasable securing or gripping engagement therewith so as to prevent the displacement of the plate from casing end wall 99 and to maintain PTCR 91 against displacement from recess means 89. In other words, straps 97 are initially bent away from the plane of plate 95 so as to extend generally in overlaying relation with casing sidewall 103 at least closely adjacent thereto exteriorly of casing 87, and the distal or free ends or portions of the straps are thereafter bent or otherwise deformed so as to overlay casing end wall 101 in the aforementioned holding, gripping or releasably securing engagement therewith. To complete the description of solid state device 31, means, such as a wavy washer type spring 115 or the like, is associated with plate 93 and casing end wall 101 within recess means 89 for resiliently urging plate 93 toward its electrical contacting engagement with contact side 111 of PTCR 91 and contact side 113 thereof toward its electrical contacting engagement with plate 95.

With reference in general to the drawings and again recapitulating at least in part with respect to the foregoing, a method is provided for assembling solid state device 31. In this method, plate 93 is positioned or otherwise located in recess means 89 so as to electrically contact and support PTCR 91 therein with terminal 83 protruding at least in part through casing opening 105 (FIGS. 5 and 6). PTCR 91 is inserted into recess means 89 so as to be located therein in the contacting and supporting engagement with plate 93. Plate 95 is then arranged on casing 87 in engagement with PTCR 91 and so as to enclose at least in part recess means 89, and the plate is thereafter secured to casing 87 with terminal 85 disposed exteriorly of the casing (FIGS. 5 and 8). Of course, upon the assembly of the component parts of solid state device 31, as discussed above, such device may then be assembled to relay means 22 with plate terminals 83, 85 mechanically and electrically mounted or connected directly with switch means terminal 57 and dummy terminal 81, as previously discussed and shown in FIG. 2.

Figure 9:
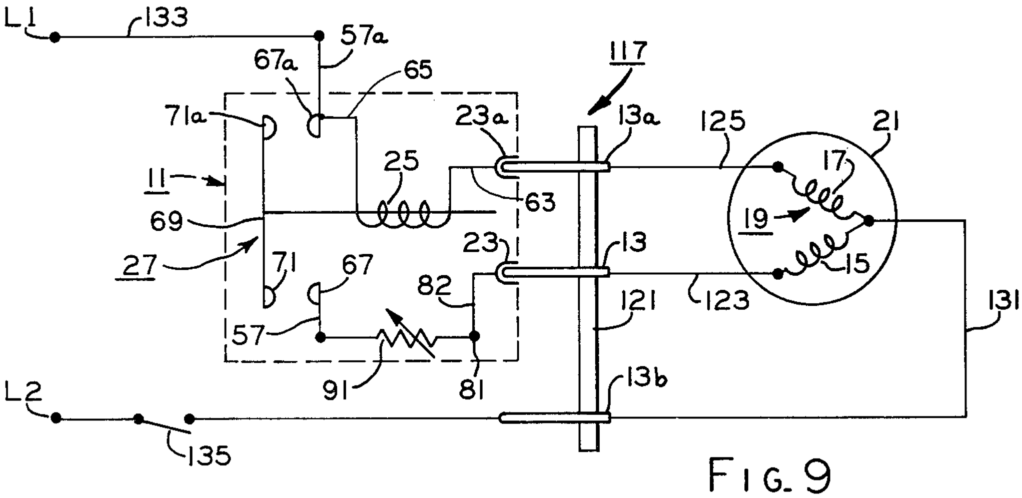
FIG. 9 is an exemplary circuit diagram showing the device of FIG. 1 schematically connected therein.

Referring to an exemplary circuit 117 shown in FIG. 9, male terminals **13, 13*a* and a third male terminal 13*b* may be mounted in a Fusite plug 121, if desired, on apparatus, such as a compressor for instance (not shown) having a hermetic environment in which prime mover 21 operates. Of course, male terminals 13, 13*a*, 13*b* may also be mounted in various other manners well-known to the art on supporting structure (not shown) of prime mover 21 within the scope of the invention so as to meet the objects and advantageous features thereof. Male terminals 13, 13*a* are connected by leads 123, 125 with auxiliary or start winding means 15 and main or run winding means 19 of prime mover 21, and a return lead 131 interconnects the auxiliary and main winding means through male terminal 13*b* to a power terminal L2 which represents one side of a power source L1, L2. To complete the exemplary circuit, another lead 133 is connected between power terminal L1 and switch means terminal 57*a* in electrical device 11, and an on-off type switch 135 may be interconnected in lead 131 (or lead 133 if desired) for controlling the energization of prime mover 21** across power source L1, L2.

In the operation of electrical device 11 in circuit 117 with the components thereof in their at-rest positions as shown in the drawings and described hereinabove, an operator may close on-off switch 135 to effect the energization of prime mover 21 across power source L1, L2. With on-off switch 135 closed, current may flow from power terminal L1 through lead 133, switch means terminal **57*a*, coil means 25, female terminal 23*a*, male terminal 13*a*, lead 125 to main winding means 17 of prime mover 21 and therefrom through return lead 131, male terminal 13*b* and closed switch 135 to power terminal L2. Of course, upon such initial energization of prime mover 21, there is a rather heavy current draw by its main winding means 17, and coil means 25 of electrical device 11 is responsive to such current draw to establish a magnetic field coupling with armature means 75 causing it to throw or rise (as best seen in FIG. 4) upwardly against the compressive force of spring 77. Of course, the force exerted by the rising movement of armature means 75 against spring 77 is transmitted therethrough to sleeve 73, and the sleeve rises on pin 51 generally conjointly with the rise of the armature means. In this manner, bridge or bridging means 69 is moved upwardly with sleeve 73 until contacts 71, 71*a* on the bridge are moved into a circuit completing position in making engagement with contacts 67, 67*a*. When contacts 71, 71*a* are made with contacts 67, 67*a*, current flows from switch means terminal 57*a* through bridge 69 to switch means terminal 57 and therefrom through plates 93, 95 and PTCR 91 of solid state device 31, dummy terminal 81, lead 82, female terminal 23, male terminal 13 and lead 123 to effect the energization or excitation of auxiliary winding means 15 generally simultaneously with the above described excitation of main winding means 17**.

During the starting time period of prime mover 21, i.e. the period of time consumed in bringing it from a standstill position to its preselected speed, PTCR 91 is energized by the current draw of auxiliary winding means 15 through electrical device 11, and generally about the time the prime mover attains its preselected speed, i.e., generally at the end of the starting time period of the prime mover, the PTCR becomes heated to its anomaly or Curie point temperature with an accompanying increase in the resistance thereof so as at least to inhibit current flow to auxiliary winding means 15 of the prime mover. In this manner, the inhibition of current flow by PTCR 91 generally as prime mover 21 attains it preselected speed renders auxiliary winding means 15 generally ineffective in winding circuit 19 of prime mover 21. Thereafter, prime mover 21 is energized in its running mode generally at the preselected speed across line terminals L1, L2 in response to the continued excitation of main winding means 17 in circuit relation with the line terminals.

Generally as prime mover 21 attains its preselected speed so as to translate from the starting mode to the running mode operation thereof, as discussed above, an appreciable reduction of the current drawn by main winding means 17 is occasioned. Of course, the occurrence of this current draw reduction or preselected electrical condition is, in effect, sensed by coil means 25, and when the current draw is so reduced to a predetermined drop-out value for electrical device 11, the magnetic affect and excitation of the coil means is correspondingly reduced. Thus, at the predetermined drop-out value, the magnetic coupling between coil means 25 and armature means 75 is insufficient to hold the armature means against the compressive force of spring 77 acting thereon. As a result, the compressive force of spring 77 drives armature means 75 in a downward direction (as best seen in FIG. 4) so as to strike a hammer-like blow onto bridge 69 causing it to break or move its contacts **71, 71*a* away from contacts 67, 67*a* in a very positive manner, and thereafter spring 77 drives the armature means, the bridge and sleeve 71 toward their at-rest or circuit interrupting positions. Of course, upon the opening or breaking of contacts 71, 71*a* from contacts 67, 67*a*, both PTCR 91 and auxiliary winding means 15 of prime mover 21 are placed in open circuit relation with respect to power source L1, L2, i.e., current flow through switching means 27 toward the PTCR and the auxiliary winding means is interrupted. Additionally and in response to the above discussed movement of switching means 27 to its circuit interrupting position, the de-energization of PTCR 91 not only alleviates any voltage drop thereacross but also permits it to cool in anticipation of a subsequent starting mode operation of prime mover 21**.

From the foregoing, it is now apparent that novel electrical devices 11, 31 have been presented meeting the objects and advantageous features set out hereinabove, as well as others, and that modifications as to the precise configurations, shapes, details and connections of such electrical devices may be made by those having ordinary skill in the art without departing from the spirit of the invention or the scope thereof as set out by the claims which follow.

What I claim as new and desire to secure by Letters Patent of the United States is:

1. An electrical device adapted to be removably mounted in plug-on circuit relation with a pair of male terminals of an electrically energized apparatus, the electrical device comprising:

a housing having a receptacle portion;

a pair of female terminals disposed in said receptacle portion and adapted for receiving the male terminal pair in the plug-on circuit relation;

a pair of switch means terminals disposed in said housing including a first pair of contacts on said switch means terminals within said housing, and a pair of exterior portions on said switch means terminals extending exteriorly of said housing, respectively;

a dummy terminal on said housing and connected in circuit relation with one of said female terminals;

coil means associated with said housing and connected in circuit relation between the other of said female terminals and one of said exterior portions of one of said switch means terminals;

switch means in said housing including means movable for bridging between said switch means terminals, a second pair of contacts on said bridging means for circuit making engagement with and breaking disengagement from said first contact pair, respectively, and armature means disposed in said housing in magnetic coupling relation with said coil means and operatively associated with said bridging means, said armature means being magnetically operable generally upon the energization of the coil means for moving said bridging means between positions respectively engaging and disengaging said second contact pair and said first contact pair;

a casing disposed at least closely adjacent said housing and including at least a base wall and a sidewall interconnected with said base wall, a generally open-ended recess in said casing between said sidewall and said base wall, and an aperture in said casing extending through at least said sidewall;

a PTCR disposed in said recess and having a pair of opposite contact sides;

a first contact plate disposed in said recess adjacent said base wall so as to be in electrical contacting engagement with one of said opposite contact sides of said PTCR, said first contact plate including a first integral terminal extending therefrom through said aperture exteriorly of said casing with said first integral terminal being mounted to one of said dummy terminal and the other of said exterior portions of the other of said switch means terminals in circuit relation therewith;

a second contact plate arranged with said casing exteriorly thereof so as to close at least in part said recess and so as to be in electrical contacting engagement with the other of said opposite contact sides of said PTCR, said second contact plate including a second integral terminal exteriorly of said casing and mounted to the other of said dummy terminal and said other exterior portion of said other switch means terminal in circuit relation therewith, and a plurality of means integral with said second contact plate and extending therefrom exteriorly of said casing across said sidewall into releasable securing engagement with said base wall for maintaining said second contact plate generally against displacement from said casing; and means associated with said first contact plate and said base wall for resiliently urging said first contact plate toward its electrical contacting engagement with said one opposite contact side of said PTCR and said other opposite contact side of said PTCR toward the electrical contacting engagement thereof with said second contact plate.

2. An electrical device adapted to be removably mounted in plug-on circuit relation with a pair of male terminals of an electrically energized apparatus, the electrical device comprising:

a housing;

a pair of female terminals disposed in said housing and adapted for receiving the male terminal pair in the plugon circuit relation;

a pair of switch means terminals disposed in said housing and at least one of said switch means terminals including an exterior portion extending exteriorly of said housing;

coil means arranged with said housing and connected in electrical circuit relation between one of said female terminals and the other of said switch means terminals;

switch means movable in said housing between circuit making and breaking positions with respect to said switch means terminals and arranged in magnetic coupling relation with said coil means;

a casing associated with said housing so as to be disposed at least closely adjacent thereto;

a PTCR disposed in said casing; and a pair of means arranged with said casing for electrically contacting and supporting said PTCR therein, said contacting and supporting means including a pair of terminal means disposed at least in part exteriorly of said casing and connected in electrical circuit relation with said exterior portion of said at least one switch means terminal and the other of said female terminals, respectively.

3. An electrical device as set forth in claim 2 further comprising a dummy terminal associated with said housing and connected in circuit relation with said other female terminal, said terminal means being mechanically and electrically mounted to said dummy terminal and said exterior portion of said at least one switch means terminal, respectively.

4. An electrical device as set forth in claim 2 wherein said casing includes a pair of opposite end portions, and recess means intersecting one of said opposite end portions, said PTCR and at least one one of said contacting and supporting means being disposed in said recess means.

5. An electrical device as set forth in claim 4 wherein said casing further includes an opening between said opposite end portions and intersecting with said recess means, one of said terminal means of said at least one contacting and supporting means protruding through said opening exteriorly of said casing.

6. An electrical device as set forth in claim 4 wherein the other of said contacting and supporting means is arranged with said one opposite end portion of said casing so as to at least in part close said recess means, and a plurality of means extending from said other contacting and supporting means generally about said casing into releasable securing engagement with the other of said opposite end portions of said casing for maintaining said other contacting and supporting means against displacement from said casing.

7. A combination relay-starter electrical device adapted for connection in circuit relation with a winding circuit of a prime mover, the electrical device comprising:

a pair of terminal means adapted for the connection in the circuit relation with the prime mover winding circuit;

coil means adapted for electrical energization;

means arranged in magnetic coupling relation with said coil means and operable generally for switching between a circuit completing position and a circuit interrupting position upon the energization of said coil means;

means for housing said terminal means, said coil means and said switching means; and a solid state device associated with said housing means and connected in circuit relation between said switching means and one of said terminal means so as to be deenergized when said switching means is in its circuit interrupting position.

8. An electrical device as set forth in claim 7 wherein said switching means includes a pair of switching means terminals each having a connector section extending exteriorly of said housing means and a contact section within said housing, said switching means in its circuit completing position being engaged between said contact sections and being disengaged therefrom in the circuit interrupting position, and said solid state device being connected in the circuit relation with said connector section of one of said switching means terminals.

9. An electrical device as set forth in claim 8 wherein said solid state device includes a pair of male terminals extending therefrom, one of said male terminals being mechanically and electrically mounted to said connector section of said one switching means terminal and the other of said male terminal being connected in the circuit relation with said one terminal means.

10. An electrical device as set forth in claim 9 further comprising a dummy terminal associated with said housing means and connected in circuit relation with said one terminal means, and the other of said male terminals of said solid state device being mechanically and electrically mounted to said dummy terminal.

11. An electrical device as set forth in claim 7 wherein said solid state device includes a casing disposed at least closely adjacent to said housing means, and a PTCR in said casing and connected in the circuit relation with said switching means and said one terminal means so as to be deenergized when said switching means is in its circuit interrupting position.

12. An electrical device as set forth in claim 7 wherein said solid state device further includes a pair of means arranged with said casing for electrically contacting and supporting said PTCR therein, and said contacting and supporting means including a pair of male terminals disposed at least in part exteriorly of said casing and connected in the circuit relation between said switching means and said one terminal means, respectively.

13. An electrical device as set forth in claim 12 wherein one of said contacting and supporting means is arranged with said casing at least in part exteriorly thereof so as to prevent the displacement of at least said PTCR from said casing, said one contacting and supporting means including a plurality of means extending generally about said casing exteriorly thereof for releasable securing engagement with said casing.

14. In an electrical device adapted to be associated in plug-on circuit relation with at least a pair of male terminals of a prime mover winding circuit, relay means having a housing, at least a pair of female terminals disposed in the housing for receiving in the plug-on relation the at least male terminal pair, means in the housing for switching between circuit completing and circuit interrupting positions upon the occurrence of a preselected electrical condition and having at least one switching means terminal extending exteriorly of the housing; the improvement therewith comprising solid state means adapted for energization and de-energization when said switching means is in its circuit completing position and its circuit interrupting position, respectively, and means for electrically contacting and supporting said solid state means so as to connect it in circuit relation between one of the female terminals and the at least one switching means terminal.

15. The electrical device as set forth in claim 14 wherein said solid state means comprises a PTCR.

16. The electrical device as set forth in claim 15 further comprising a casing disposed at least closely adjacent the housing, said PTCR being disposed within said casing and said contacting and supporting means being associated with said casing.

17. The electrical device as set forth in claim 16 wherein said casing includes a pair of opposite end wall means, and recess means in said casing intersecting with one of said opposite end wall means, said PTCR being disposed in said recess means, one of said contacting and supporting means being disposed at least in part within said recess means at least closely adjacent the other of said end wall means and the other of said contacting and supporting means being disposed at least in part on said one opposite end wall means so as to at least in part close said recess means.

18. The electrical device as set forth in claim 14 wherein said contacting and supporting means respectively include terminal means connected in the circuit relation between the one female terminal and the at least one switching means terminal, one of said terminal means being mechanically and electrically mounted to the at least one switching means terminal.

19. The electrical device as set forth in claim 14 further comprising a dummy terminal associated with the housing and connected in circuit relation with the one female terminal, said contacting and supporting means being mechanically and electrically mounted to said dummy terminal and the at least one switching means terminal, respectively.

20. An electrical device adapted for connection generally in circuit relation with a source of power and a winding circuit of a dynamoelectric machine, the electrical device comprising:

a casing having a plurality of wall means;

means in said casing adapted for controlling starting of the dynamoelectric machine;

means for electrically contacting and supporting said starting controlling means disposed in said casing between said starting controlling means and one of said wall means of said wall means plurality so as to engage said starting and controlling means, said contacting and supporting means including means extending at least in part through at least another of said wall means of said wall means plurality and adapted for connection in the circuit relation with one of the power source and the dynamoelectric machine winding circuit;

means associated with said casing at least in part generally exteriorly thereof for retaining said starting controlling means against displacement from said casing, said displacement retaining means including another means disposed generally in opposed relation with said first named contacting and supporting means so as to also engage said starting controlling means for electrically contacting and supporting said starting controlling means, another means on said another contacting and supporting means adapted for connection in the circuit relation with the other of the power source and the dynamoelectric machine winding circuit, and a plurality of means on said another contacting and supporting means and extending exteriorly of said casing generally over said at least another wall means and said one wall means into gripping engagement with said one wall means for releasably securing said retaining means to said casing; and means separate from said another contacting and supporting means for urging it in a direction toward engagement with said starting controlling means and also for urging said starting controlling means in the direction toward engagement with said first named contacting and supporting means.

21. An electrical device comprising:

a casing including a plurality of wall means defining a recess means therein;

a PTCR disposed in said recess means;

first means engaged with said PTCR for electrically contacting and supporting said PTCR disposed within said recess means and including first terminal means extending at least in part through at least one of said wall means of said plurality thereof; and means arranged with said casing exteriorly thereof so as to close at least in part said recess means for retaining against displacement therefrom said PTCR, said displacement retaining means including second means engaged with said PTCR for electrically contacting and supporting said PTCR, second terminal means on said second contacting and supporting means, and a plurality of means on said second contacting and supporting means extending exteriorly of said casing generally across one of said one wall means and another of said wall means of said wall means plurality into engagement with the other of said one wall means and said another wall means for releasably securing said retaining means with said casing; and resilient means separate from said first contacting and supporting means and disposed between said other wall means and said first contacting and supporting means for urging said first contacting and supporting means toward the engagement thereof with said PTCR and also for urging the PTCR toward the engagement thereof with said second contacting and supporting means.

22. An electrical device as set forth in claim 20 wherin said starting controlling means comprises a PTCR.

23. An electrical device as set forth in claim 20 wherein said casing includes an opening through at least said one wall means and said at least another wall means, said first named connection means extending through said opening.

24. An electrical device as set forth in claim 20 wherein said releasably securing means plurality comprises a plurality of fingers integral with said another contacting and supporting means and having free ends engaged with said one wall means, respectively.

25. An electrical device as set forth in claim 21 wherein said casing further includes means in said at least one wall means and arranged for accommodating the extension therethrough of said first terminal means.

26. An electrical device as set forth in claim 21 wherein said releasably securing means plurality comprises a plurality of fingers having free ends engaged with the other of said one wall means and said another wall means.

27. An electrical device comprising:

a casing including a pair of opposite end walls, a sidewall respectively interconnected between said end wall pair, a recess between said end wall pair and said sidewall and having a generally open end intersecting with one of said end walls, and a passage in at least one of said sidewall and the other of said end walls;

a PTCR disposed in said recess and having a pair of opposite contact sides;

a first contact plate disposed in said recess adjacent said other end wall and in electrical contacting engagement with one of said opposite contact sides of said PTCR, said first contact plate including a first integral terminal at least in part extending through said passage exteriorly of said casing;

a second contact plate arranged with said one end wall so as to at least in part close said open end of said recess and disposed in electrical contacting engagement with the other of said opposite contact sides of said PTCR, said second contact plate including a second integral terminal exteriorly of said casing, and a plurality of integral fingers spaced generally about the periphery of said second contact plate and extending therefrom exteriorly of said casing across said sidewall thereof, and a plurality of free ends on said fingers of said plurality thereof and arranged in gripping engagement with said other end wall of said casing exteriorly thereof so as to maintain said second contact plate against displacement from said casing; and spring means in said recess arranged between said other end wall of said casing and said first contact plate and separate from said first contact plate for urging it into the electrical contacting engagement with said one opposite contact side of said PTCR and said other opposite contact side of said PTCR into the electrical contacting engagement with said second contact plate.

* * * * *